(12) United States Patent
Lee

(10) Patent No.: US 7,267,900 B2
(45) Date of Patent: Sep. 11, 2007

(54) FUEL CELL SYSTEM

(75) Inventor: Jong Hyun Lee, Seongnam (KR)

(73) Assignee: Hyundai Motor Company, Seoul (KR)

( * ) Notice: Subject to any disclaimer, the term of this patent is extended or adjusted under 35 U.S.C. 154(b) by 685 days.

(21) Appl. No.: 10/751,046

(22) Filed: Dec. 31, 2003

(65) Prior Publication Data

US 2005/0008910 A1  Jan. 13, 2005

(30) Foreign Application Priority Data

Jul. 11, 2003  (KR) .................. 10-2003-0047158

(51) Int. Cl.
   *H01M 8/04* (2006.01)
(52) U.S. Cl. .................. 429/26; 429/19; 429/22
(58) Field of Classification Search .................. 429/26, 429/19, 22
   See application file for complete search history.

(56) References Cited

U.S. PATENT DOCUMENTS 6,416,892 B1 *  7/2002  Breault .................. 429/13
6,416,895 B1    7/2002  Voss et al.
6,432,566 B1 *  8/2002  Condit et al. .................. 429/17
6,572,994 B1    6/2003  Shimotori et al.
2001/0021468 A1  9/2001  Kanai et al.
2002/0039674 A1  4/2002  Suzuki et al.
2003/0017373 A1  1/2003  Forte et al.
2004/0258968 A1 * 12/2004  Voss et al. .................. 429/26

FOREIGN PATENT DOCUMENTS

JP  2002-216826  2/2002
KR  2003-0082418  10/2003

* cited by examiner

*Primary Examiner*—Tracy Dove
(74) *Attorney, Agent, or Firm*—Morgan Lewis & Bockius LLP

(57) ABSTRACT

The fuel cell system comprises a fuel cell stack, a fuel gas supply unit, an oxidation gas supply unit, a fuel cell cooling unit, a fuel gas humidifier, an oxidation gas humidifier, and a control unit. The fuel gas humidifier humidifies fuel gas that is supplied to the fuel cell stack from the fuel gas supply unit by using remaining fuel gas that is exhausted from the fuel cell stack. The oxidation gas humidifier humidifies oxidation gas that is supplied to the fuel cell stack from the oxidation gas supply unit by using remaining oxidation gas that is exhausted from the fuel cell stack.

22 Claims, 3 Drawing Sheets

FUEL CELL SYSTEM

CROSS-REFERENCE TO RELATED APPLICATIONS

This application claims priority of Korean Application No. 10-2003-0047158, filed on Jul. 11, 2003, the disclosure of which is incorporated fully herein by reference.

FIELD OF THE INVENTION

The present invention relates to a fuel cell system, and more particularly, to a fuel system that is capable of humidifying a fuel gas and an oxidation gas supplied to a fuel cell stack using moisture contained in remaining fuel gas and remaining oxidation gas exhausted from the fuel cell stack.

BACKGROUND OF THE INVENTION

A proton exchange membrane fuel cell (PEMFC) is a device for converting chemical energy of fuel (fuel gas) to electrical energy. A PEMFC implements a solid polymer as an electrolyte membrane (an ion exchange membrane). An anode is disposed on one side of the membrane, and a cathode is disposed on the other side of the membrane. Generally, an assembly including the membrane, the anode, and the cathode is called an MEA (membrane and electrode assembly).

A general operation temperature of the PEMFC is less than 100 degrees Celsius, and the PEMFC is generally used as power source of a vehicle or as a small electric power source.

In the PEMFC, hydrogen is supplied to the anode (fuel electrode), and oxidation gas (air) is supplied to the cathode (air electrode). Hydrogen that is supplied to the anode is resolved into hydrogen ions $H^+$ and electrons $e^-$ by a catalyst. The hydrogen ions are transmitted to the cathode through the membrane, and the electrons are transmitted to the cathode through a separation plate, which is made of a conductive material. The hydrogen ions and the electrons that are supplied to the cathode react with oxidation gas supplied to the cathode to generate water. At this time, electron flow from the anode to the cathode generates a current, and heat and water are also generated during the reaction.

Such a reaction in the PEMFC is as follows:

[Reaction in the anode]

$$2H_2 \rightarrow 4H^+ + 4e^-$$

[Reaction in the cathode]

$$O_2 + 4H^+ + 4e^- \rightarrow 2H_2O$$

[Whole reaction]

$$2H_2 + O_2 \rightarrow 2H_2O + \text{electric energy} + \text{thermal energy}$$

In the PEMFC, for a smooth flow of hydrogen ions from the anode to the cathode, sufficient moisture must be supplied to the membrane through which the hydrogen ions flow. A device to supply moisture to the membrane is generally called a humidifier, and various kinds of humidifiers are being developed.

When the membrane is not sufficiently humidified, moisture on a surface of the membrane is evaporated by gases supplied to the membrane. Accordingly, the membrane lacks moisture for the transmission of the hydrogen ions, and the hydrogen ions are not transmitted. This deteriorates an electro-chemical reaction in the fuel cell.

On the other hand, when excessive water is supplied by the humidifier, or when the fuel cell operates under a high output so that excessive water is generated in the fuel cell, excessive water may be supplied to the membrane. When water is excessively supplied to the membrane, the catalyst reacting the hydrogen ions, the electrons, and the oxidation gas is surrounded by the water. Accordingly, access of the hydrogen ions and the oxidation gas to the catalyst is hindered, so that the output of the fuel cell drops.

Therefore, in order to operate the PEMFC at optimal efficiency, supplied moisture and generated water must be considered, based on operating conditions, to regulate the amount of water supplied by the humidifier.

A conventional humidifier used for the PEMFC humidifies the hydrogen and the oxidation gas with fuel cell stack cooling water that circulates in the fuel cell stack. By using such an integrated humidifier, the volume of the fuel cell system can be decreased. However, safety cannot be assured when there is an assembling defect or an outside shock. Furthermore, in the PEMFC using the conventional humidifier, water for humidification is supplied from the fuel cell stack cooling water that is composed of de-ionized water (DI water). Therefore, the humidifier of the PEMFC cannot operate below the freezing point.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

The present invention provides a fuel cell system in which fuel gas and oxidation gas that are supplied to a fuel cell stack are humidified by water contained in remaining fuel gas and remaining oxidation gas that are exhausted from the fuel cell stack. Therefore, an anti-freeze solution can be used as coolant for cooling the fuel cell stack.

In a preferred embodiment of the present invention, the fuel cell system comprises a fuel cell stack, a fuel gas supply unit, an oxidation gas supply unit, a fuel cell cooling unit, a fuel gas humidifier, an oxidation gas humidifier, and a control unit. The fuel gas supply unit supplies fuel gas to the fuel cell stack. The oxidation gas supply unit supplies oxidation gas to the fuel cell stack. The fuel cell cooling unit circulates coolant through the fuel cell stack to cool the fuel cell stack. The fuel gas humidifier humidifies fuel gas that is supplied to the fuel cell stack from the fuel gas supply unit by using remaining fuel gas that is exhausted from the fuel cell stack. The oxidation gas humidifier humidifies oxidation gas that is supplied to the fuel cell stack from the oxidation gas supply unit by using remaining oxidation gas that is exhausted from the fuel cell stack. The control unit controls the fuel gas supply unit, the oxidation gas supply unit, and the fuel cell cooling unit.

It is preferable that the fuel gas humidifier comprises a pair of separating plates and a humidifying membrane. The separating plates are disposed to face each other such that the coolant exhausted from the fuel cell stack flows therebetween. The humidifying membrane is disposed at a side of the separating plates such that remaining fuel gas exhausted from the fuel cell stack flows in one side of the humidifying membrane and a fuel gas that is supplied to the fuel cell stack from the fuel gas supply unit flows in the other side of the humidifying membrane. Heat contained in the coolant flowing between the pair of separating plates and heat contained in the remaining fuel gas are transmitted to the fuel gas supplied to the fuel cell stack, and water contained in the remaining fuel gas is supplied to the fuel gas supplied to the fuel cell stack through the humidifying membrane.

It is preferable that the oxidation gas humidifier comprises a pair of separating plates and a humidifying membrane. The separating plates are disposed to face each other such that the coolant exhausted from the fuel cell stack flows therebetween. The humidifying membrane is disposed at a side of the separating plate such that the remaining oxidation gas exhausted from the fuel cell stack flows in one side of the humidifying membrane, and oxidation gas that is supplied to the fuel cell stack from the oxidation gas supply unit flows in the other side of the humidifying membrane. The heat contained in the coolant flowing between the pair of separating plates and heat contained in the remaining oxidation gas are transmitted to the oxidation gas supplied to the fuel cell stack, and water contained in the remaining oxidation gas is supplied to the oxidation gas supplied to the fuel cell stack through the humidifying membrane.

Preferably, the fuel cell cooling unit comprises a radiator, a coolant circulating passage, and a coolant pump. The radiator is configured to dissipate heat contained in the coolant after it passes through the fuel cell stack. The coolant circulating passage connects the fuel cell stack and the radiator such that the coolant circulates through the fuel cell stack and the radiator. The coolant pump is disposed in the coolant circulating passage and pumps the coolant such that the coolant cooled by the radiator is supplied to the fuel cell stack and the coolant that has absorbed heat in the fuel cell stack is supplied to the radiator.

It is preferable that the fuel cell cooling unit further comprises a coolant bypass passage and a coolant filter. The coolant bypass passage bypasses the fuel cell stack. The coolant filter is disposed in the coolant bypass passage and filters the coolant.

Preferably, the coolant is an anti-freeze solution. It is further preferable that the fuel cell system comprises an auxiliary humidifier unit controlled by the control unit, the auxiliary humidifier unit collecting water contained in the remaining fuel gas passing through the fuel gas humidifier and in the remaining oxidation gas passing through the oxidation gas humidifier. The auxiliary humidifier unit comprises an auxiliary humidifier humidifying the fuel gas that is supplied to the fuel cell stack from the fuel gas supply unit and the oxidation gas that is supplied to the fuel cell stack from the oxidation gas supply unit.

It is preferable that the auxiliary humidifier unit comprises a remaining exhaust condensation unit, a water storage unit, a first injector, and a second injector. The remaining exhaust condensation unit condenses the remaining fuel gas passing through the fuel gas humidifier and the remaining oxidation gas passing through the oxidation gas humidifier. The water storage unit receives and stores water generated by the remaining exhaust condensation unit. The first injector injects water stored in the water storage unit into the fuel gas supplied to the fuel cell stack from the fuel gas supply unit, while the second injector injects water stored in the water storage unit into the oxidation gas supplied to the fuel cell stack from the oxidation gas supply unit.

Preferably, the auxiliary humidifier unit further comprises an electric heater disposed at the auxiliary humidifier for heating water stored in the water storage unit, and it is preferable that the electric heater is controlled to operate for a predetermined time if the ambient temperature is lower than a predetermined temperature.

The first and second injectors are preferably ultrasonic injection nozzles, and they are preferably controlled to operate for a predetermined time after commencing operation of the fuel cell stack.

It is preferable that the remaining exhaust gas condensation unit comprises a first condenser, a second condenser, a radiator, a coolant circulating passage, and a coolant pump. The first condenser condenses the remaining fuel gas after it passes through the fuel gas humidifier, while the second condenser condenses the remaining oxidation gas after it passes through the oxidation gas humidifier. The radiator cools the coolant after it passes through the first and second condensers. The coolant circulating passage connects the first and second condensers and the radiator such that the coolant circulates through the first and second condensers and the radiator. The coolant pump is disposed in the coolant circulating passage and pumps the coolant such that the coolant that passes through the radiator is supplied to the fuel cell stack, the first and second condensers, and then back to the radiator.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanying drawings.

Figure 1:
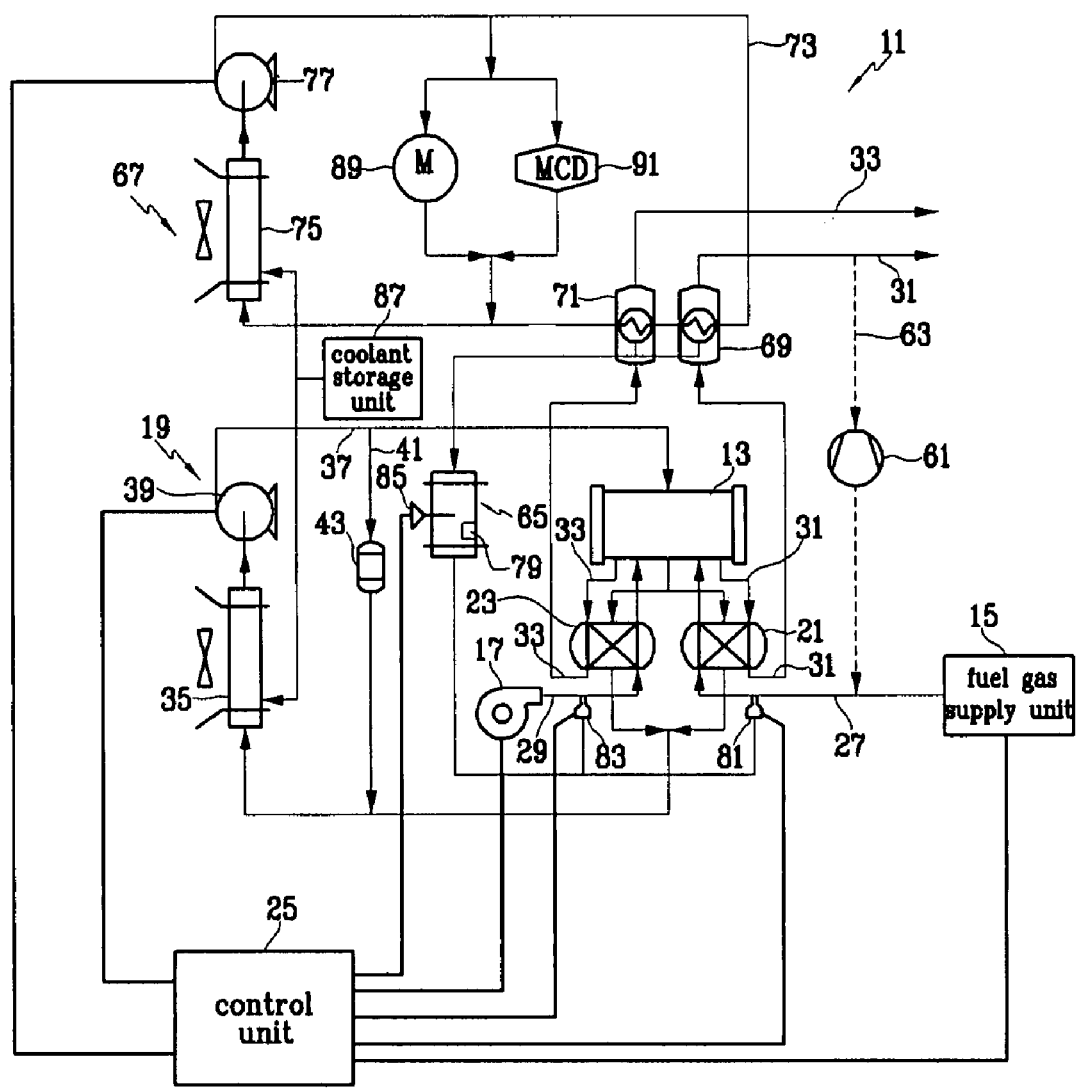
FIG. 1 is a schematic block diagram showing the fuel cell system according to the preferred embodiment of the present invention.

As shown in FIG. 1, a fuel cell system 11 according to the preferred embodiment of the present invention includes a fuel cell stack 13, a fuel gas supply unit 15, an oxidation gas supply unit 17, a fuel cell cooling unit 19, a fuel gas humidifier 21, an oxidation gas humidifier 23, and a control unit 25.

The control unit 25 may comprise a processor and associated hardware as may be selected and programmed by a person of ordinary skill in the art, based on the teachings of the present invention.

The fuel cell stack 13 includes a plurality of fuel cells, and each fuel cell is preferably a proton exchange membrane fuel cell. The fuel cell stack 13 generates electrical energy through an electrochemical reaction between fuel gas and oxidation gas.

In the fuel cell system 11 according to the preferred embodiment of the present invention, the fuel gas can be hydrogen and the oxidation gas can be oxygen. The oxidation gas can be supplied to the fuel cell stack 13 by supplying air including oxygen to the fuel cell stack 13.

The fuel gas supply unit 15 supplies fuel gas to the fuel cell stack through a fuel gas supply line 27, and the oxidation gas supply unit 17 supplies oxidation gas to the fuel cell stack 13 through an oxidation gas supply line 29. The fuel gas supply unit 15 can be a fuel gas tank storing fuel gas, and the oxidation gas supply unit 17 can be an air blower that supplies oxidation gas (more concretely, air including oxygen) to the fuel cell stack 13.

The oxidation gas and fuel gas that are supplied to the fuel cell stack 13 react with each other, and electrical energy is generated as a result of the reaction.

Portions of the oxidation gas and fuel gas that are supplied to the fuel cell stack 13 remain unreacted with each other. The remaining fuel gas is exhausted from the fuel cell stack 13 through a remaining fuel gas exhaust line 31, and the remaining oxidation gas is exhausted from the fuel cell stack 13 through a remaining oxidation gas exhaust line 33.

The fuel cell cooling unit 19 dissipates heat generated in the fuel cell stack 13 into the atmosphere, and thereby prevents the temperature of the fuel cell stack 13 from rising too high. The fuel cell cooling unit 19 includes a radiator 35. Instead of the radiator 35, any heat exchanger can be used.

An outlet of the radiator 35 is connected to an inlet of the fuel cell stack 13 through a coolant circulating line 37, and an outlet of the fuel cell stack 13 is connected to an inlet of the radiator 35 through the coolant circulating line 37 by way of the fuel gas and oxidation gas humidifiers 21 and 23.

A coolant pump 39 is disposed in the coolant circulating line 37. The coolant pump 39 pumps the coolant inside the coolant circulating line 37 to circulate the coolant through the radiator 35, the fuel cell stack 13, and the fuel gas and oxidation gas humidifiers 21 and 23.

Therefore, heat generated by the fuel cell stack 13 is absorbed by the coolant, and the heat absorbed by the coolant is primarily transmitted to the atmosphere by the radiator 35, so that the fuel cell stack 13 is cooled. In the fuel cell system 11 according to the preferred embodiment of the present invention, it is preferable that the coolant is an anti-freeze solution.

In the fuel cell system 11 according to the preferred embodiment of the present invention, fuel gas and oxidation gas that are supplied to the fuel cell stack 13 are humidified using water contained in the remaining fuel gas and the remaining oxidation gas that are exhausted from the fuel cell stack 13. That is, because the fuel gas and oxidation gas are not humidified by the coolant, the coolant does not need to be de-ionized water (DI water).

Because the anti-freeze solution is used as the coolant, the fuel cell cooling unit 19 of the fuel cell system 11, according to the preferred embodiment of the present invention, can operate at a lower ambient temperature (e.g., at a sub-zero temperature) than that of the conventional fuel cell system. As an example, the coolant of the fuel cell system 11 according to the preferred embodiment of the present invention can be a mixture of ethylene glycol and pure water (e.g., 50% ethylene glycol and 50% pure water).

A portion of the coolant (e.g., 10% of the coolant) passes through a coolant bypass passage 41 that bypasses the fuel cell stack 13 and the fuel gas and oxidation gas humidifiers 21 and 23, and through a coolant filter 43 that is disposed in the coolant bypass passage 41. Ethylene can corrode components through which the coolant passes causing impurities to exist in the coolant, and such impurities may cause a malfunction of the fuel cell stack 13. The coolant filter 43 removes such impurities from the coolant.

The fuel gas humidifier 21 humidifies fuel gas that is supplied to the fuel cell stack 13.

Figure 2:
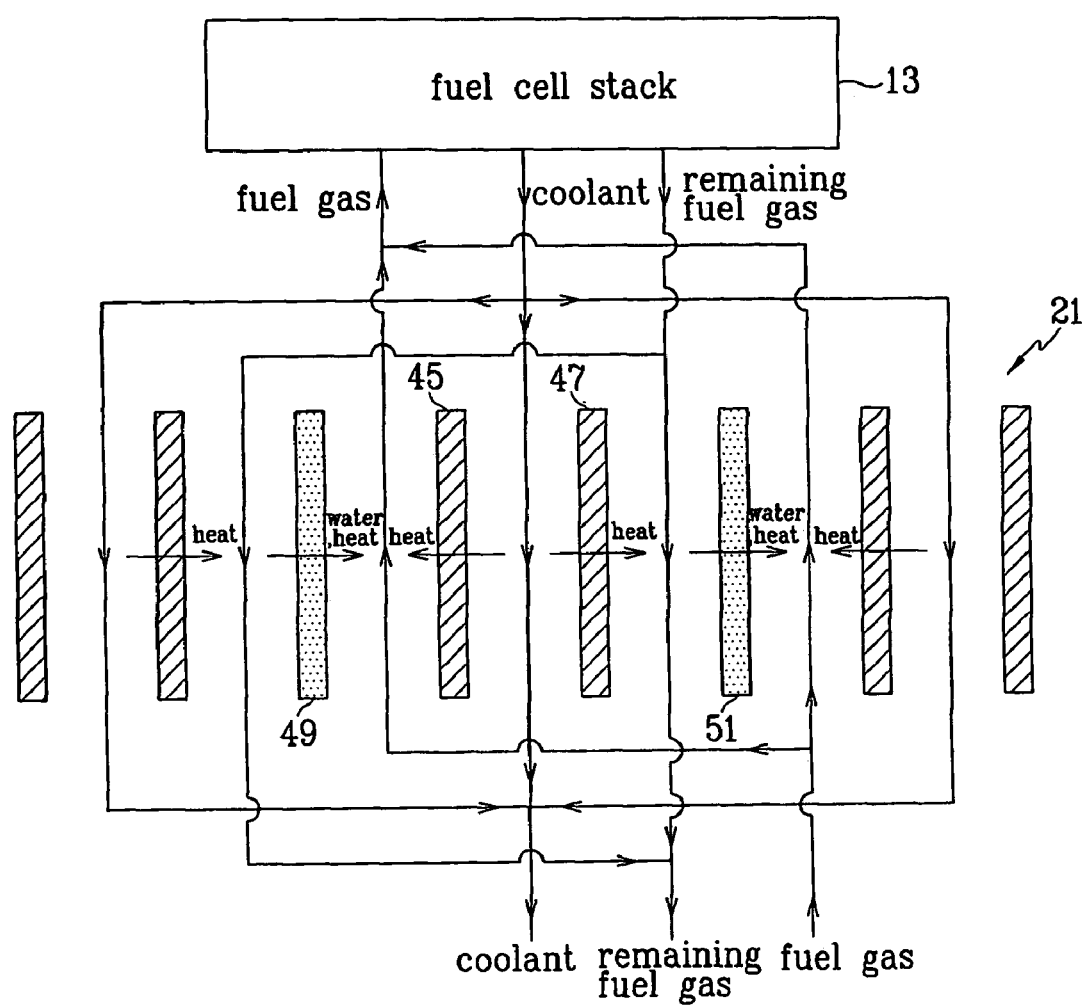
FIG. 2 shows a fuel gas humidifier of the fuel cell system of FIG. 1.

As shown in FIGS. 1 and 2, fuel gas is supplied to the fuel cell stack 13 through the fuel gas supply line 27, and remaining fuel gas is exhausted from the fuel cell stack through the remaining fuel gas exhaust line 31 and the fuel gas humidifier 21. The coolant exhausted from the fuel cell stack 13 also passes through the fuel gas humidifier 21.

The fuel gas humidifier 21 includes a pair of separating plates 45 and 47 that are disposed facing each other, and at least one humidifying membrane 49 (or 51). The separating plates 45 and 47 can be made of a polymer, e.g. polycarbonate or graphite. The humidifying membrane 49 (or 51) is a kind of ion exchange membrane, and it can be any membrane that can transmit water therethrough. As shown in FIG. 2, the humidifying membrane 49 is disposed outside of the separating plates 45 and 47.

The coolant that is exhausted from the fuel cell stack 13 flows between the pair of the separating plates 45 and 47. The remaining fuel gas that is exhausted from the fuel cell stack 13 flows on one side of the humidifying membrane 49 (or 51), and the fuel gas that is supplied to the fuel cell stack 13 flows on the other side of the humidifying membrane 49.

Because the coolant flows between the separating plates 45 and 47, the flow of the coolant is separated from the flows of the fuel gas that are supplied to and exhausted from the fuel cell stack 13. Because the remaining fuel gas exhausted from the fuel cell stack 13 flows past one side of the humidifying membrane 49 and the fuel gas supplied to the fuel cell stack 13 flows past the other side of the humidifying membrane 49, water contained in the remaining fuel gas exhausted from the fuel cell stack 13 is transmitted to the fuel gas supplied to the fuel cell stack 13 through the humidifying membrane 49, thereby humidifying the fuel gas supplied to the fuel cell stack 13. Further, heat contained in the coolant and the remaining fuel gas exhausted from the fuel cell stack 13 is transmitted to the fuel gas supplied to the fuel cell stack 13.

By regulating areas and numbers of the separating plates 45 and 47 and humidifying membranes 49 and 51, the fuel gas supplied to the fuel cell stack 13 can be suitably humidified. It is preferable that the fuel gas is humidified by the fuel gas humidifier 21 such that the relative humidity of the supplied fuel gas becomes 75±10% RH.

Figure 3:
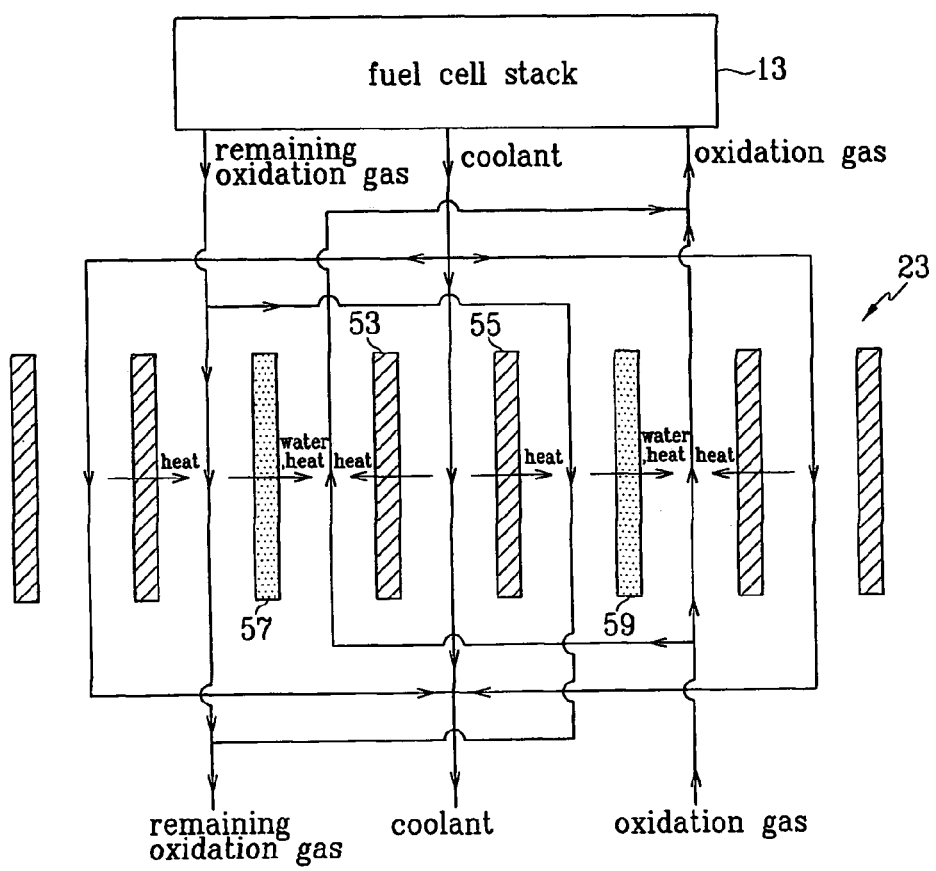
FIG. 3 shows an oxidation gas humidifier of the fuel cell system of FIG. 1.

As shown in FIG. 3, the oxidation gas humidifier 23 has a similar structure with the fuel gas humidifier 21. The oxidation gas humidifier 23 includes a pair of separating plates 53 and 55 that are disposed facing each other, and at least one humidifying membrane 57 (or 59).

The coolant that is exhausted from the fuel cell stack 13 flows between the pair of the separating plates 53 and 55. The remaining oxidation gas that is exhausted from the fuel cell stack 13 flows on one side of the humidifying membrane 57, and the oxidation gas that is supplied to the fuel cell stack 13 flows on the other side of the humidifying membrane 57 (or 59).

The separating plates 53 and 55 can be made of the same material as the separating plates 45 and 47 of the fuel gas humidifier 21, and the humidifying membrane 57 can also be made of the same material as the humidifying membrane 49 of the fuel gas humidifier 21.

Therefore, water contained in the remaining oxidation gas exhausted from the fuel cell stack 13 is transmitted to the oxidation gas supplied to the fuel cell stack 13 through the humidifying membrane 57. Accordingly, the oxidation gas supplied to the fuel cell stack 13 is humidified.

In addition, heat contained in the coolant and the remaining oxidation gas exhausted from the fuel cell stack is transmitted to the oxidation gas supplied to the fuel cell stack 13.

Similar to the fuel gas humidifier 21, by regulating areas and numbers of the separating plates 53 and 55 and the humidifying membranes 57 and 59, the oxidation gas supplied to the fuel cell stack 13 can be suitably humidified.

It is preferable that the oxidation gas is humidified by the oxidation gas humidifier 23 such that the relative humidity of the supplied oxidation gas becomes 35±10% RH.

The fuel cell system 11 according to the preferred embodiment of the present invention includes a fuel gas recycling unit 61 for recycling a portion of the remaining fuel gas exhausted from the fuel cell stack 13.

The fuel gas recycling unit 61 is disposed in a fuel gas recycling line 63 connecting the remaining fuel gas exhaust line 31 and the fuel gas supply line 27, and it forces a portion of the exhausted fuel gas to the fuel gas supply line 27, so that the fuel gas is supplied to the fuel cell stack 13. As an example, the fuel gas recycling unit 61 can be a compressor.

The fuel cell system 11 according to the preferred embodiment of the present invention further comprises an auxiliary humidifier unit including an auxiliary humidifier 65 for humidifying the fuel gas and the oxidation gas that are supplied to the fuel cell stack 13. The auxiliary humidifier 65 collects water from the remaining fuel gas that has passed through the fuel gas humidifier 21 and from the remaining oxidation gas that has passed through the oxidation gas humidifier 23 and humidifies the oxidation gas and the fuel gas that are supplied to the fuel cell stack 13 using the collected water.

The auxiliary humidifier unit further includes an exhaust gas condensing unit 67 for condensing water contained in the remaining fuel gas that has passed through the fuel gas humidifier 21 and in the remaining oxidation gas that has passed through the oxidation gas humidifier 23. It still further includes a first condenser 69 for condensing the remaining fuel gas that has passed through the fuel gas humidifier 21, and a second condenser 71 for condensing the remaining oxidation gas that has passed through the oxidation gas humidifier 23.

The first and second condensers 69 and 71 are connected to a radiator 75 through a coolant circulating passage 73. A coolant pump 77 is disposed in the coolant circulating passage 73, and the coolant pump 77 pumps coolant such that the coolant circulates through the first and second condensers 69 and 71 and the radiator 75, through the coolant circulating passage 73.

While the coolant passes through the first and second condensers 69 and 71, the first and second condensers condense water contained in the remaining fuel gas and the remaining oxidation gas, thereby allowing water to be collected from the remaining exhaust gas. Water collected by the first and second condensers 69 and 71 is stored in a water storage unit 79 disposed at the auxiliary humidifier 65.

At this time, using the coolant circulating through the exhaust gas condensing unit 67, a motor 89 and a motor control unit 91 can preferably be cooled.

In addition, the auxiliary humidifier unit includes a first injector 81 disposed in the fuel gas supply line 27 to inject water into the fuel gas in the fuel gas supply line 27, and a second injector 83 disposed in the oxidation gas supply line 29 to inject water into the oxidation gas in the oxidation gas supply line 29.

The first and second water injectors 81 and 83 can be ultrasonic micro-spray nozzles. An ultrasonic micro-spray nozzle is a device for injecting liquid using ultrasound. The ultrasonic micro-spray nozzle is well known in the art, so further explanation of the same will be omitted.

Water is supplied to each of the first and second injectors 81 and 83. The first injector 81 injects the supplied water into the fuel gas supply line 27, and the second injector 83 injects the supplied water into the oxidation gas supply line 29.

The control unit 25 controls operation of the first and second injectors 81 and 83. It is preferable that the first and second injectors 81 and 83 are controlled to operate for a predetermined time (e.g., 10 seconds) after the operation of the fuel cell system 11. Because water is not sufficiently contained in the remaining oxidation gas and the remaining fuel gas in an initial stage of the operation of the fuel cell system 11, the supplied fuel gas and oxidation gas are humidified by the auxiliary humidifier unit including the auxiliary humidifier 65 in the initial state of operation of the fuel cell system 11.

Water is supplied to each of the first and second injectors 81 and 83. The first injector 81 injects the supplied water into the fuel gas supply line 27, and the second injector 83 injects the supplied water into the oxidation gas supply line 29.

The control unit 25 controls operation of the first and second injectors 81 and 83. It is preferable that the first and second injectors 81 and 83 are controlled to operate for a predetermined time (e.g., 10 seconds) after the operation of the fuel cell system 11. Because water is not sufficiently contained in the remaining oxidation gas and the remaining fuel gas in an initial stage of the operation of the fuel cell system 11, the supplied fuel gas and oxidation gas are humidified by the auxiliary humidifier unit including the auxiliary humidifier 65 in the initial state of operation of the fuel cell system 11.

At this time, it is preferable that the fuel gas is humidified at a relative humidity of 75±10% RH and the oxidation gas is humidified at a relative humidity of 35±10% RH.

Preferably, the water storage unit 79 has a size suitable for containing an amount of water for humidifying the oxidation gas and the fuel gas for about 10 seconds.

The fuel cell system 11 according to the preferred embodiment of the present invention further comprises an electric heater 85 that is disposed in the water storage unit 79. The electric heater 85 can be any arbitrary device for generating heat using electric power provided from an external power source (e.g., a battery). When water stored in the water storage unit 79 is frozen, the electric heater 85 can melt it.

The control unit 25 controls operation of the electric heater 85. It is preferable that the control unit 25 controls the electric heater 85 to operate if the ambient temperature is lower than a predetermined temperature (e.g., 40° C.). The ambient temperature can be detected by a temperature sensor (not shown).

The fuel cell system 11 includes a coolant storage unit 87 for storing the coolant that circulates through the fuel cell cooling unit 19 and the exhaust gas condensing unit 67.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

According to the preferred embodiment of the present invention, the oxidation gas and the fuel gas are humidified by water contained in the remaining oxidation gas and fuel gas exhausted from the fuel cell stack, so it is possible for an anti-freeze solution to be used for the coolant. Therefore, the fuel cell system can operate at sub-zero temperatures.

Furthermore, because the fuel cell system according to the preferred embodiment of the present invention includes the auxiliary humidifier, the fuel gas and the oxidation gas can be humidified in the initial stage of operation of the fuel cell system.

What is claimed is:

1. A fuel cell system comprising:
a fuel cell stack;
a fuel gas supply unit for supplying fuel gas to the fuel cell stack;
an oxidation gas supply unit for supplying oxidation gas to the fuel cell stack;
a fuel cell cooling unit for circulating coolant through the fuel cell stack to cool the fuel cell stack;
a fuel gas humidifier for humidifying the fuel gas that is supplied to the fuel cell stack from the fuel gas supply unit by using remaining fuel gas that is exhausted from the fuel cell stack;
an oxidation gas humidifier for humidifying the oxidation gas that is supplied to the fuel cell stack from the oxidation gas supply unit by using remaining oxidation gas that is exhausted from the fuel cell stack; and
a control unit for controlling the fuel gas supply unit, the oxidation gas supply unit, and the fuel cell cooling unit,
wherein the fuel gas humidifier comprises:
a pair of separating plates that are disposed to face each other such that coolant exhausted from the fuel cell stack flows therebetween; and
a humidifying membrane disposed at a side of the separating plates such that remaining fuel gas exhausted from the fuel cell stack flows on one side of the humidifying membrane and fuel gas that is supplied to the fuel cell stack from the fuel gas supply unit flows on the other side of the humidifying membrane,
and wherein heat contained in coolant flowing between the pair of separating plates and heat contained in the remaining fuel gas are transmitted to the fuel gas supplied to the fuel cell stack, and water contained in the remaining fuel gas is supplied to the fuel gas supplied to the fuel cell stack through the humidifying membrane.

2. The fuel cell system of claim 1, wherein the fuel cell cooling unit comprises:
a radiator configured to dissipate heat contained in coolant that has passed through the fuel cell stack;
a coolant circulating passage connecting the fuel cell stack and the radiator such that coolant circulates through the fuel cell stack and the radiator; and
a coolant pump disposed in the coolant circulating passage and pumping coolant such that coolant cooled by the radiator is supplied to the fuel cell stack and coolant with absorbed heat from the fuel cell stack is supplied to the radiator.

3. The fuel cell system of claim 2, wherein the fuel cell cooling unit further comprises:
a coolant bypass passage that bypasses the fuel cell stack; and
a coolant filter disposed in the coolant bypass passage, filtering coolant.

4. The fuel cell system of claim 1, wherein the coolant is an anti-freeze solution.

5. The fuel cell system of claim 1, further comprising an auxiliary humidifier unit including an auxiliary humidifier controlled by the control unit collecting water contained in the remaining fuel gas that has passed through the fuel gas humidifier and in the remaining oxidation gas that has passed through the oxidation gas humidifier, and the auxiliary humidifier unit humidifying the fuel gas that is supplied to the fuel cell stack from the fuel gas supply unit and the oxidation gas that is supplied to the fuel cell stack from the oxidation gas supply unit.

6. The fuel cell system of claim 5, wherein the auxiliary humidifier unit further comprises:
a remaining exhaust condensation unit for condensing remaining fuel gas that has passed through the fuel gas humidifier and remaining oxidation gas that has passed through the oxidation gas humidifier;
a water storage unit for receiving and storing water generated by the remaining exhaust condensation unit;
a first injector for injecting the water stored in the water storage unit into the fuel gas supplied to the fuel cell stack from the fuel gas supply unit; and.
a second injector for injecting the water stored in the water storage unit into the oxidation gas supplied to the fuel cell stack from the oxidation gas supply unit.

7. The fuel cell system of claim 6, wherein the auxiliary humidifier unit further comprises an electric heater for heating the water stored in the water storage unit.

8. The fuel cell system of claim 7, wherein the electric heater is controlled to operate for a predetermined time if an ambient temperature is lower than a predetermined temperature.

9. The fuel cell system of claim 6, wherein the first and second injectors are ultrasonic injection nozzles.

10. The fuel cell system of claim 6, wherein the first and second injectors are controlled to operate for a predetermined time after commencing operation of the fuel cell stack.

11. The fuel cell system of claim 6, wherein the remaining exhaust gas condensation unit comprises:
a first condenser condensing the remaining fuel gas that has passed through the fuel gas humidifier;
a second condenser condensing the remaining oxidation gas that has passed through the oxidation gas humidifier;
a radiator cooling coolant that has passed through the first and second condensers;
a coolant circulating passage connecting the first and second condensers and the radiator such that the coolant circulates through the first and second condensers and the radiator; and
a coolant pump disposed in the coolant circulating passage and pumping the coolant such that coolant that has passed through the radiator is supplied to the first and second condensers, and then back to the radiator.

12. A fuel cell system comprising:
a fuel cell stack;
a fuel gas supply unit for supplying fuel gas to the fuel cell stack; an oxidation gas supply unit for supplying oxidation gas to the fuel cell stack;
a fuel cell cooling unit for circulating coolant through the fuel cell stack to cool the fuel cell stack;
a fuel gas humidifier for humidifying the fuel gas that is supplied to the fuel cell stack from the fuel gas supply unit by using remaining fuel gas that is exhausted from the fuel cell stack;
an oxidation gas humidifier for humidifying the oxidation gas that is supplied to the fuel cell stack from the oxidation gas supply unit by using remaining oxidation gas that is exhausted from the fuel cell stack; and
a control unit for controlling the fuel gas supply unit, the oxidation gas supply unit, and the fuel cell cooling unit,
wherein the fuel gas humidifier comprises:

a pair of separating plates that are disposed to face each other such, that the coolant exhausted from the fuel cell stack flows therebetween; and a humidifying membrane disposed at a side of the separating plates such that remaining fuel gas exhausted from the fuel cell stack flows on one side of the humidifying membrane and fuel gas that is supplied to the fuel cell stack from the fuel gas supply unit flows on the other side of the humidifying membrane, wherein heat contained in coolant flowing between the pair of separating plates and heat contained in the remaining fuel gas are transmitted to the fuel gas supplied to the fuel cell stack, and water contained in the remaining fuel gas is supplied to the fuel gas supplied to the fuel cell stack through the humidifying membrane, wherein the oxidation gas humidifier comprises:

a pair of separating plates that are disposed to face each other such that coolant exhausted from the fuel cell stack flows therebetween; and a humidifying membrane disposed at a side of the separating plates such that remaining oxidation gas exhausted from the fuel cell stack flows on one side of the humidifying membrane and oxidation gas that is supplied to the fuel cell stack from the oxidation gas supply unit flows on the other side of the humidifying membrane, and wherein heat contained in coolant flowing between the pair of separating plates and heat contained in the remaining oxidation gas are transmitted to the fuel gas supplied to the fuel cell stack, and water contained in the remaining oxidation gas is supplied to the oxidation gas supplied to the fuel cell stack through the humidifying membrane.

13. The fuel cell system of claim 12, wherein the fuel cell cooling unit comprises:

a radiator configured to dissipate heat contained in coolant that has passed through the fuel cell stack;

a coolant circulating passage connecting the fuel cell stack and the radiator such that coolant circulates through the fuel cell stack and the radiator; and a coolant pump disposed in the coolant circulating passage and pumping coolant such that coolant cooled by the radiator is supplied to the fuel cell stack and coolant with absorbed heat from the fuel cell stack is supplied to the radiator.

14. The fuel cell system of claim 13, wherein the fuel cell cooling unit further comprises:

a coolant bypass passage that bypasses the fuel cell stack; and a coolant filter disposed in the coolant bypass passage, filtering coolant.

15. The fuel cell system of claim 12, wherein the coolant is an anti-freeze solution.

16. The fuel cell system of claim 12, further comprising an auxiliary humidifier unit including an auxiliary humidifier controlled by the control unit collecting water contained in the remaining fuel gas that has passed through the fuel gas humidifier and in the remaining oxidation gas that has passed through the oxidation gas humidifier, and the auxiliary humidifier unit humidifying the fuel gas that is supplied to the fuel cell stack from the fuel gas supply unit and the oxidation gas that is supplied to the fuel cell stack from the oxidation gas supply unit.

17. The fuel cell system of claim 16, wherein the auxiliary humidifier unit further comprises:

a remaining exhaust condensation unit for condensing remaining fuel gas that has passed through the fuel gas humidifier and remaining oxidation gas that has passed through the oxidation gas humidifier;

a water storage unit for receiving and storing water generated by the remaining exhaust condensation unit;

a first injector for injecting the water stored in the water storage unit into the fuel gas supplied to the fuel cell stack from the fuel gas supply unit; and a second injector for injecting the water stored in the water storage unit into the oxidation gas supplied to the fuel cell stack from the oxidation gas supply unit.

18. The fuel cell system of claim 17, wherein the auxiliary humidifier unit further comprises an electric heater for heating the water stored in the water storage unit.

19. The fuel cell system of claim 18, wherein the electric heater is controlled to operate for a predetermined time if an ambient temperature is lower than a predetermined temperature.

20. The fuel cell system of claim 17, wherein the first and second injectors are ultrasonic injection nozzles.

21. The fuel cell system of claim 17, wherein the first and second injectors are controlled to operate for a predetermined time after commencing operation of the fuel cell stack.

22. The fuel cell system of claim 17, wherein the remaining exhaust gas condensation unit comprises:

a first condenser condensing the remaining fuel gas that has passed through the fuel gas humidifier;

a second condenser condensing the remaining oxidation gas that has passed through the oxidation gas humidifier;

a radiator cooling coolant that has passed through the first and second condensers;

a coolant circulating passage connecting the first and second condensers and the radiator such that coolant circulates through the first and second condensers and the radiator; and a coolant pump disposed in the coolant circulating passage and pumping coolant such that coolant that has passed through the radiator is supplied to the first and second condensers, and then back to the radiator.

* * * * *